United States Patent [19]
Tamura et al.

[11] Patent Number: 5,395,170
[45] Date of Patent: Mar. 7, 1995

[54] MINIATURE LINEAR GUIDE DEVICE AND ITS MANUFACTURING METHOD

[75] Inventors: Teishirou Tamura; Tomohiro Imanishi, both of Maebashi, Japan

[73] Assignee: NSK Ltd., Tokyo, Japan

[21] Appl. No.: 139,824

[22] Filed: Oct. 22, 1993

[30] Foreign Application Priority Data

Nov. 4, 1992 [JP] Japan .................. 4-319485

[51] Int. Cl.⁶ .................................... F16C 29/06
[52] U.S. Cl. ................................................ 384/45
[58] Field of Search ........................... 384/45, 43, 44; 464/168

[56] References Cited

U.S. PATENT DOCUMENTS

| | | | |
|---|---|---|---|
| 5,232,288 | 8/1993 | Mottate | 384/45 |
| 5,248,202 | 9/1993 | Kawasugi et al. | 384/45 |
| 5,281,028 | 1/1994 | Morita | 384/45 |
| 5,340,219 | 8/1994 | Agari | 384/45 |

*Primary Examiner*—Lenard A. Footland
*Attorney, Agent, or Firm*—Oblon, Spivak, McClelland, Maier & Neustadt

[57] ABSTRACT

A miniature linear guide device comprising a U-shaped rail member with a ball-rolling groove on each of the inner surfaces of the two opposing side walls, a slider with a ball-rolling groove on each of the external sides, positioned inside the U-shaped rail member, a ball-circulating member housed inside the slider, which has ball circuits communicating with the aforementioned ball-rolling grooves, and a plurality of balls filled in the ball circuits and the areas between the ball-rolling grooves. Slits are formed on one side wall near both ends of the rail member in the longitudinal direction by cutting the side wall vertically. The end sections of the side wall of the rail member, which are set off by the slits are then bent toward the inside of the rail member in the lateral direction so that they can function as stoppers for the slider.

The manufacturing method for this miniature linear guide device consists of the following steps: The bearing assembly, consisting of the slider and ball-circulating member, is preassembled. Then this assembly is inserted through one end of the rail member while loading it with balls. Finally, the end sections of the side wall of the rail member beyond the slits are bent inwards in the lateral direction of the rail member.

2 Claims, 6 Drawing Sheets

MINIATURE LINEAR GUIDE DEVICE AND ITS MANUFACTURING METHOD

BACKGROUND OF THE INVENTION

1. Field of the Invention

The present invention relates to a miniature linear motion guide device (hereinafter referred to as the miniature linear guide device) in which a bearing assembly travels linearly along a U-shaped rail member via a plurality of balls that roll in a circulatory manner, and the manufacturing method for the device. In particular, the present invention relates to a miniature linear guide device in which one side wall, at both ends of said rail member, functions as a stopper for said bearing assembly, to prevent the assembly from sliding out of said rail member, and a method for assembling the device.

2. Discussion of the Prior Art

There has been well known in the prior art a lightweight miniature linear guide device which is made of thin plate and comprises a thin-walled, U-shaped rail member made of steel sheet which functions as a linear motion slideway, and a bearing assembly which is housed inside the U-shaped portion of said rail member and which travels reciprocally in a linear track in the longitudinal direction thereof. A bearing assembly of the type mentioned has a U-shaped slider which is also made of thin steel plate with ball-rolling grooves on the sides thereof. Within the slider, a ball-circulating member called a circulator is secured. Ball circuits which are elongated partial toroids in shape are formed in the ball-circulating member and are interconnected smoothly with the ball-rolling grooves on the slider. On the internal surfaces of the opposing walls of the U-shaped rail member, ball-rolling grooves are formed in such a manner that they face the ball-rolling grooves on the slider and a plurality of balls fills the area between the grooves and also fills the ball circuits in the circulator. As the bearing assembly travels the linear track in the longitudinal direction of the rail member, the balls roll in a circulatory motion.

Since the device features a structure in which the ball-rolling grooves on the rail member run through both ends of the rail in the longitudinal direction, and the bearing assembly itself is capable of unrestricted linear motion on the rail member, if the bearing assembly were to slide out through one end of the rail member, the balls inside would fall out and the device would come apart. In order to prevent this, in the prior art device, a means of stopping is provided on both ends of the rail member to stop the bearing assembly from sliding out of the rail member. For example, in the prior art device illustrated in FIGS. 5–7, removable plastic stopper members 2 are detachably mounted by fitting them into the ball-rolling grooves 1A near both ends of the rail member 1 to function as stoppers for the bearing assembly 3 during transportation and until the device is installed in the target instrument. Then, before the miniature linear guide device is installed in the target instrument, the stopper members 2 are removed from the rail member 1.

An example of forming stopper members as an integral part of the rail member is illustrated in FIG. 8. Here, the two ends of the bottom plate 21A of the U-shaped rail member 21 are extended outwards beyond the ends of the side plates 21B. Then the two ends of the bottom plate are bent inwards (upwards) to form an approximate L-shape and the bent sections become stoppers 22 that prevent the bearing assembly 3 from sliding out.

Generally, in miniature linear guide devices, there is a relatively large gap between the bottom plate of the rail member and the lower surface of the bearing assembly. Whereas, in the slideway between the sides of the rail member and the sides of the bearing assembly, where the balls are fitted into the ball-rolling grooves, there is very little play. The tolerances here are measured in units of $\mu$m. Thus, if the miniature balls should come out, the device will not easy to reassemble. Therefore, we can say that stopping the bearing assembly from sliding out of a miniature linear guide device of this type is very important. However, with the means of stopping in the prior art, as illustrated in FIGS. 5–7, the separate removable plastic parts that are provided on the rail member as stoppers must be removed when the miniature linear guide device is installed in the target instrument. This means that, at some point during the working operation, the miniature linear guide device must be handled without stoppers. Inevitably, the bearing assembly sometimes gets separated from the rail member by mistake during this phase. Also, there is always the risk of the stoppers becoming disengaged due to vibration or the like during transportation. After the miniature linear guide device is installed in the target instrument and the motion of the bearing assembly is controlled by the drive unit of the target instrument, the means of stopping are no longer necessary. Structuring the stopper members as separate from the rail member, removable parts increases the number of parts and assembly steps, thereby increasing the cost of production.

On the other hand, with the linear guide device illustrated in FIG. 8, in which the rail member 21 and stoppers 22 are integrated as a unit, because the bearing assembly 3 is positioned with a large clearance from the rail member bottom plate 21A, as explained earlier, it is necessary to bend the ends of the bottom plate of the rail member to a considerable height in order for them to reliably function as stoppers. Also, to prevent such adverse effects as distortion of the raceway track in the rail side plate 21B at the time of the bending operation, the ends of the bottom plate must be extended greatly in the longitudinal direction, increasing the dimensions of the unit as a whole. Also, while the ends are bent upwards, the entire flat area of the bottom plate 21A in the lateral direction must also be bent to form an L shape. Thus, the process will necessitate a press machine or another special tool. If they are bent inadequately, it may allow sliding out or cause biting in when the bearing assembly comes into hard contact with the bends.

Furthermore, with the structure mentioned above, it is not possible to assemble the device by inserting the separately assembled bearing assembly 3 in through one end in the longitudinal direction of the rail member 21 after bending the ends of the bottom plate into an L shape. With this structure, therefore, it is necessary to first divide the circulator of the bearing assembly 3 into two sections; a top part and a bottom part, and then fit them in order to the upper surface of the rail member 21. This presents the problem of increased assembly steps.

SUMMARY OF THE INVENTION

It is therefore an object of the present invention to provide a miniature linear guide device which does not to require the addition of any special members for stopping the bearing assembly from sliding out, and which is still relatively compact and provides a reliable stopping function.

Another object of the present invention is to provide a method of manufacturing such a miniature linear guide device, in which it is relatively easy to form stoppers at the ends of the rail member, and one in which assembly and production of the entire device can be performed easily, and one in which the stoppers can be released after assembly for repair work and the like.

According to the present invention, it is provided a miniature linear guide device comprising a U-shaped rail member that has ball-rolling grooves on the two opposing inner wall surfaces, a slider with ball-rolling grooves on the sides and which is positioned on the inside of said U-shaped rail member, a circulator housed inside said slider with ball circuits that communicate with said ball-rolling grooves, and a plurality of balls filled in the ball circuits and the areas between said ball-rolling grooves, said rail member being formed with slits on one side wall near both ends thereof, in the longitudinal direction, by cutting the side wall vertically, the end sections of the side wall of the rail member, which are set off by said slits, being bent toward the inside of the rail in the lateral direction so that they can function as stoppers for the slider.

Manufacture of the miniature linear guide device according to the present invention can be easily accomplished with the following procedure:

The slider is inserted into the U-shaped rail member via one end with the circulator already mounted on the slider and while balls are loaded into the ball circuit and the areas between the ball-rolling grooves. After that, the end sections of the side wall, which are set off by the slits on the U-shaped rail member, are bent inwards in the lateral direction of the rail member so that they can function as stoppers for the slider.

In the present invention, because slits are formed near both ends of the side wall of the rail member in the longitudinal direction, the end sections of the side wall that are set off by the slits become pliable. Reliable stoppers for the bearing assembly which consists of the slider and the circulator can be provided by bending said end sections inwards in the lateral direction of the rail member using a simple tool such as a pair of pliers, after the assembly of the entire structure is completed. As the gap between the sides of the bearing assembly and the rail member is 1 mm or less, bending these sections even very slightly will create effective stoppers for the slider.

For the production of this device, the bearing assembly is preassembled separately from the rail member. Then the preassembled bearing assembly is mounted on the rail member before bending the stoppers by inserting along the raceway track from one end of the rail member while loading the balls. Finally the stoppers are created by bending the end sections inwards and the miniature linear guide device is thus easily assembled.

DESCRIPTION OF THE PREFERRED EMBODIMENTS

Figure 1:
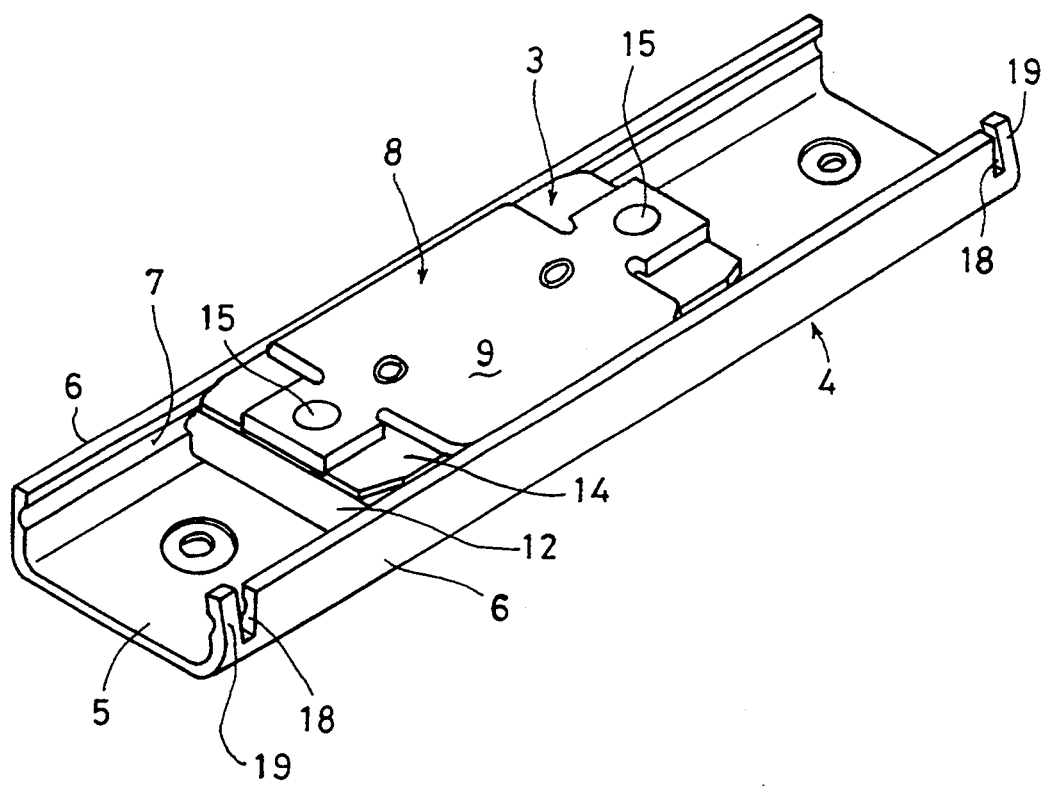
FIG. 1 is an overall perspective view of an embodiment of the miniature linear guide device of the present invention.
Figure 2:
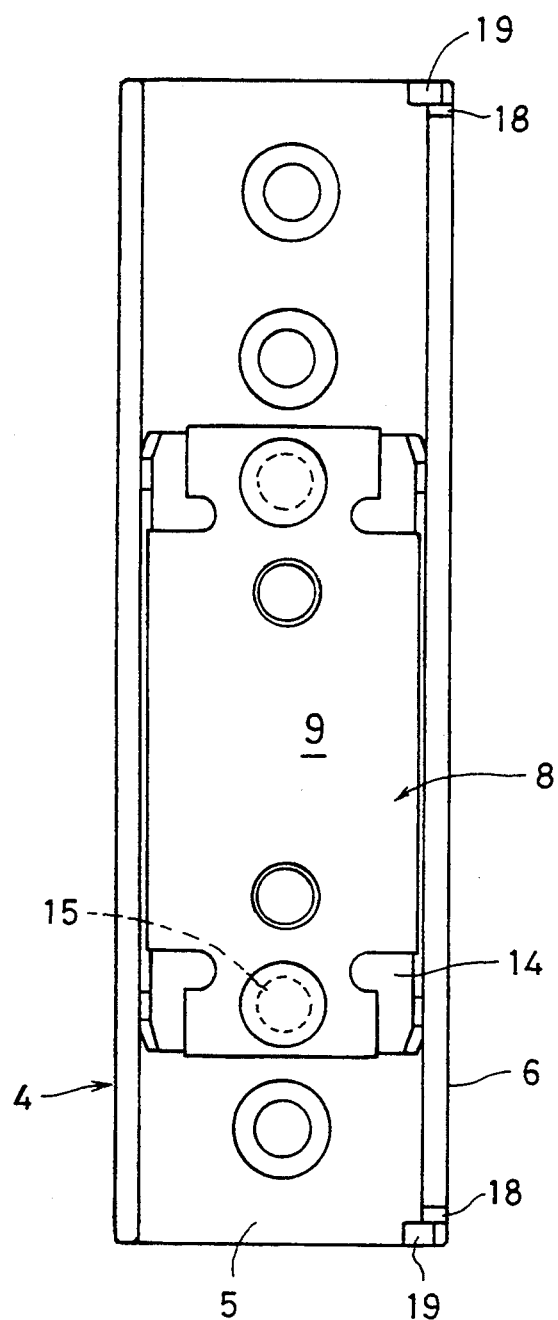
FIG. 2 is a top view of the embodiment shown in FIG. 1.
Figure 3:
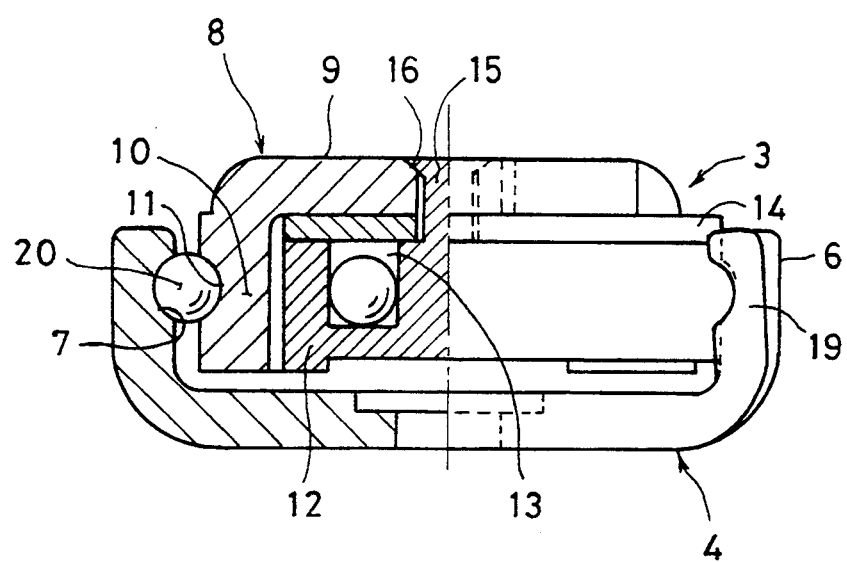
FIG. 3 is a cut-away front view of the embodiment of FIG. 1 viewed from the end in the longitudinal direction of the rail.

This invention will now be described in reference to the preferred embodiments shown in the attached drawings.

Referring now to FIGS. 1–4, the guide rail member 4 is formed as a U-shaped member consisting of the bottom plate 5 secured on to the target instrument with bolts (not shown) in which the device is to be installed, and side walls 6 formed on both sides of the bottom plate 5, and on the inner surfaces of the two side walls 6, a rail-side ball-rolling groove 7 is formed extending in the longitudinal direction. The slider 8 which is shaped approximately like an inverted U, is connected to the movable part of the target instrument by the top member 9 which has mounting holes to accommodate installation on to the target instrument. The slider also has side plates 10 facing the inner surfaces of the two side walls 6 of the U-shaped rail member 4, and slider-side ball-rolling grooves 11 are formed on the outer surfaces of the two side plates 10 of the slider. The circulator 12 is made of plastic and functions as a ball-circulating member. As shown in the exploded perspective view in FIG. 4, the circulator 12 has ball circuits 13 at both sides which are shaped like elongated partial toroids viewed from the top. The ball circuits 13 are covered with a plastic cap 14 which is a flat plate mounted on the upper surface of the ball circulator 12 functioning as a lid. The circulator 12 is housed and secured within the inverted U-shaped slider 8, which holds the cap 14 onto the circulator and fusible protrusions 15 are provided on the top surface of the circulator as a means of securing the circulator 12 by welding. By inserting the raised protrusions 15 of the circulator 12 through the holes 16 and 17 which are provided in the cap 14 and slider 8 and by then applying heat, the circulator 12 can be secured to the slider 8. The circulator 12, cap 14 and slider 8 constitute the bearing assembly 3.

Figure 4:
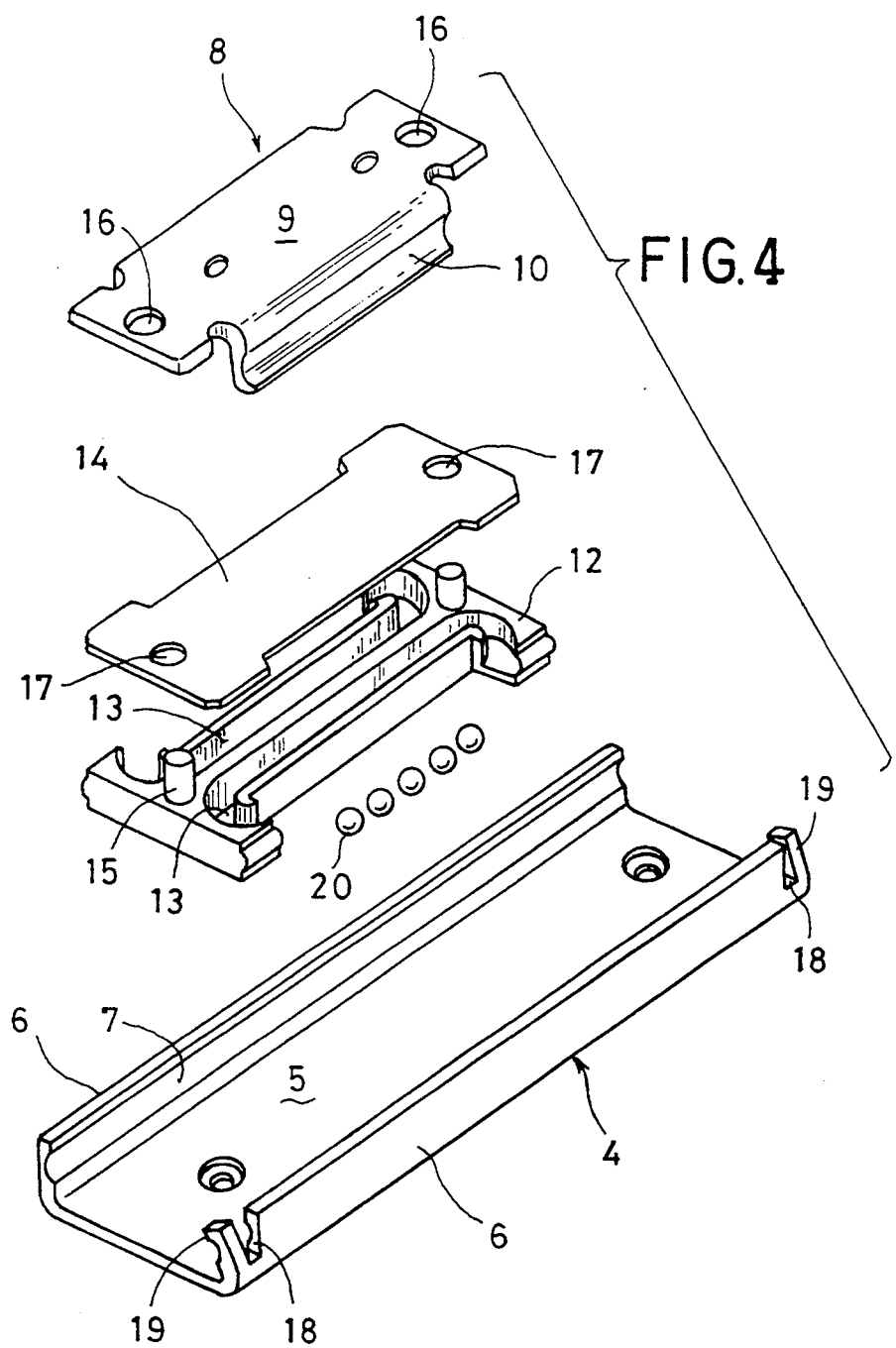
FIG. 4 is an exploded perspective view of an embodiment of the present invention.
Figure 5:
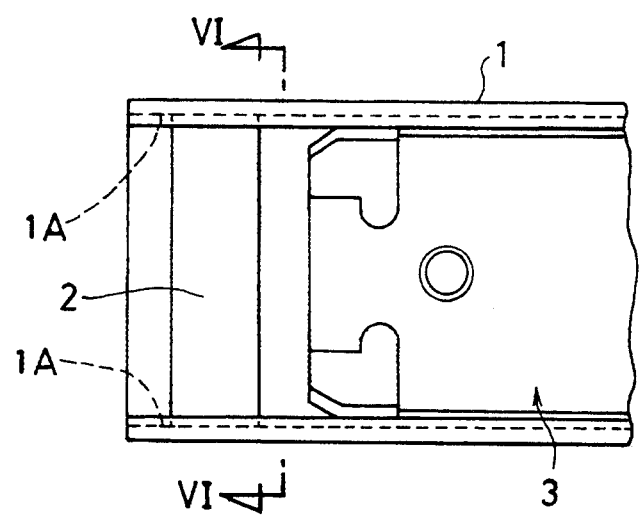
FIG. 5 is a partial plan of the prior art miniature linear guide device with removable stopper members in place.
Figure 6:
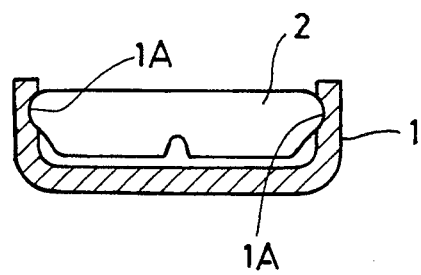
FIG. 6 is a cross section taken along the line VI—VI in FIG. 5.
Figure 7:
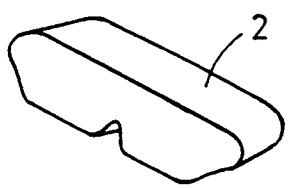
FIG. 7 is a perspective view of the prior art removable stopper member.
Figure 8:
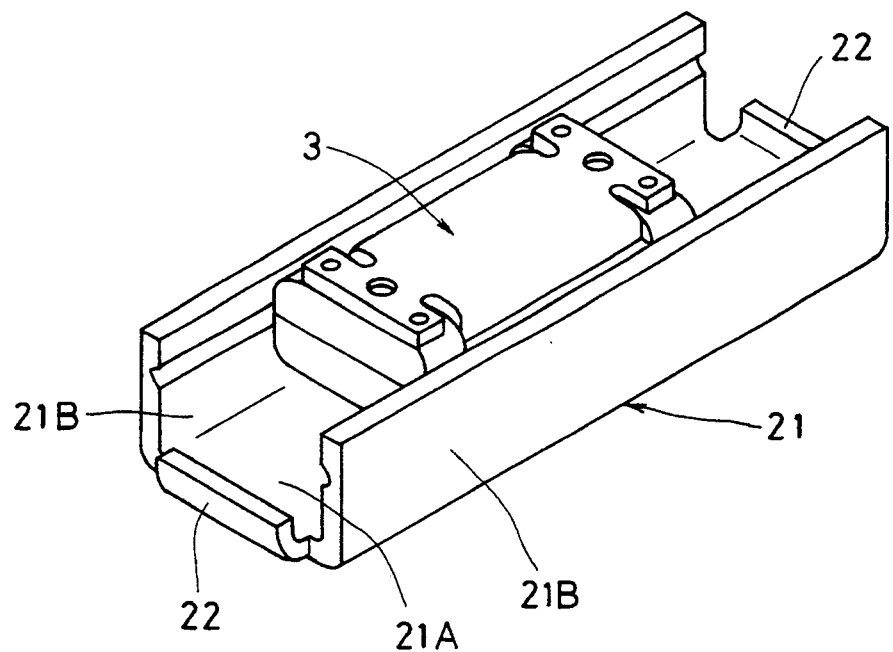
FIG. 8 is a perspective view of an example of the prior art device in which the ends of the bottom plate of the rail member are bent upwards to form stoppers.

As shown in FIGS. 1 and 4, the slits 18 that cut the side wall vertically near the both ends in the longitudinal direction, are formed on one of the side walls 6 of the U-shaped rail member 4 to set off said end sections 19. With this structure, it becomes possible to bend the end sections 19 inwards in the lateral direction of the rail (transverse direction). The slider 8, circulator 12 and cap 14 are assembled as mentioned above and are housed inside the U-shaped rail member 4, and balls 20 are filled into the ball circuits 13 of the circulator 12 and the areas between the railside ball-rolling grooves 7 and the slider-side ball-rolling grooves 11. In this state, it becomes possible for the bearing assembly 3 to make a reciprocating motion along the rail member 4 accompanied by a rolling motion of the balls 20. By slightly bending inwards in the lateral direction of the rail member the side wall end sections 19 provided at both ends of the rail member 4, the end sections 19 of the side wall come into contact with the ends of the bearing assembly 3 effectively stopping the bearing assembly 3 from sliding out in the longitudinal direction of the rail member 4. As has been mentioned earlier, since the gap between the side wall outer surface of the bearing assembly 3 and the side wall inner surface of the rail member 4 is very small, the side wall end sections 19 will provide a stopper function even if they are bent in only slightly. In addition, when the bearing assembly is to be separated from the rail member 4 for repairs or the like of the miniature linear guide device, the bearing assembly 3 can be removed and disassembled easily by resetting one of the bent side wall end sections 19 to its original position.

When assembling a miniature linear guide device with the abovementioned structure, fitting the circulator, cap and slider from the top side onto the rail member in which stoppers are already formed by bending in the side wall end sections, and then heat-fusing the protrusions 15 for securing the circulator, cap and slider after inserting the balls, will cause problems of imprecision arising from thermal distortion of the balls and the like. Also this assembly method is procedurally disadvantageous. Therefore, in the present invention, the bearing assembly 3 is assembled using a jig or the like outside the rail member before the stoppers are created by bending the end sections of rail member 4. Then, while the bearing assembly 3 is inserted along the rail member 4 from one end thereof, balls are loaded in starting with the rail-side ball-rolling grooves 7, the slider-side ball-rolling grooves 11, into the ball circuits 13 inside the circulator 12. Finally stoppers are formed by slightly bending the side wall end sections 19 of the rail member 4.

It should be noted that with the type of circulator that is divided into two sections, top and bottom, which does not require heat fusing the protrusion of the bearing assembly, it is possible to mount in the bearing assembly components in order from the top side even after creating stoppers on the rail member. However, even with this type, if the completed bearing assembly is inserted from the end of the rail member and the stoppers are formed as the final step, production can be carried out more efficiently and even automatic assembly is possible.

As has been explained above, in the present invention, since slits are formed on both ends of side one wall of the guide rail member and stoppers are created by bending inwards the end sections set off by the slits to prevent the bearing assembly from sliding out, the separate plastic stopper parts used in the prior art technology are precluded, providing a reduction in production costs. Furthermore, as the amount of bending may be very small, the work can be performed easily under any circumstances and the operation can be performed manually by using a simple tool such as a pair of pliers. Also, releasing the stoppers for disassembly, repair and the like can be easily performed. By separately preassembling the bearing assembly, inserting it from one end of the rail member and then finally forming the stoppers, great advantages can be obtained, including improved production efficiency and the possibility of automatic assembly.

What is claimed is:

1. A miniature linear guide device comprising;
   a U-shaped rail member having ball-rolling grooves formed on the two opposing internal surfaces of the side walls thereof,
   a slider having ball-rolling grooves formed on the external sides thereof, said slider being located within said U-shaped rail member,
   a circulator having ball circuits communicating with said ball-rolling grooves to constitute circulatory ball pathways, said circulator being located within said slider, and
   a plurality of balls filled in said ball circuits and the areas between both of said ball-rolling grooves, wherein;
   slits are formed on a side wall of said U-shaped rail member near both ends thereof in the longitudinal direction, cutting said side wall vertically, forming end sections on said side wall, said end sections on said side wall being set off by said slits and bent toward the inside in the lateral direction of the rail member to form stoppers for the slider.

2. The miniature linear guide device as claimed in claim 1, wherein; said circulator is secured in said slider, and said end sections of said side wall are bent inwards in the lateral direction of said rail member to come in contact with the ends of said circulator and to thereby form stoppers for said slider.

* * * * *